United States Patent [19]

Symons

[11] 3,738,667
[45] June 12, 1973

[54] SELF-ENERGIZING FACE SEALS
[75] Inventor: James D. Symons, Southfield, Mich.
[73] Assignee: General Motors Corporation, Detroit, Mich.
[22] Filed: Jan. 25, 1971
[21] Appl. No.: 109,450

[52] U.S. Cl. .................................. 277/96, 277/133
[51] Int. Cl. .......................... F16j 15/34, F16j 15/54
[58] Field of Search ...................... 277/95, 96, 134, 277/133

[56] References Cited
UNITED STATES PATENTS
3,589,739    6/1971    Scholten .............................. 277/96

Primary Examiner—George E. Lowrance
Assistant Examiner—Robert I. Smith
Attorney—J. L. Carpenter, E. J. Biskup and P. D. Sachtjen

[57] ABSTRACT

A face seal is provided with an annular groove on its fluid side adjacent the sealing contact surface for reducing the torsional rigidity of the latter under dynamic conditions such that the minute waves which are inherent in the contact surface are increasingly helically inclined by viscous shear forces in the direction of prevailing relative rotation to thereby provide increased hydrodynamic pumping action at the sealing interface.

2 Claims, 6 Drawing Figures

PATENTED JUN 12 1973

3,738,667

INVENTOR.
James D. Symons
BY
Peter D. Sachtjen
ATTORNEY

SELF-ENERGIZING FACE SEALS

The present invention relates to fluid seals and, in particular, to fluid seals having means for increasing the inherent hydrodynamic pumping action at the sealing interface.

Recently, it has become known that the inherent sealing capabilities of fluid seals can be explained by the dynamic functioning of surface irregularities in the sealing contact surface. Seals of this type generally have at least two minute projections or waves about the circumference of the sealing surface which are inherently formed during manufacture and assembly. Under static conditions, these waves are substantially parallel to the fluid leakage path having little or no helical inclination with respect to the axis of rotation. However, during dynamic operation wherein fluid is drawn between the contact surface and the rotating part, the viscous shear forces of the fluid torsionally deform each wave to establish a minute helical inclination with respect to the sealing interface. Thereupon, the deformed waves act as viscous shear pumps to maintain a pressure gradient across the sealing interface. The waves also function as a hydrodynamic bearing to provide a load carrying capacity and maintain a film at the interface. As a practical matter however, the waves which are present, regardless of the direction of relative rotation, generally do not significantly increase the sealing capabilities. Therefore, reliance must be placed on other design techniques to provide dependable sealing.

The present invention contemplates a novel refinement in the basic fluid seal construction that significantly increases the helical inclination of the inherent waves and the effectiveness of the pumping action thereby reducing the sealing pressure required to effect dynamic and static sealing. In the preferred embodiment, an annular groove is formed in the fluid side of the seal and extends generally parallel to the sealing surface and beyond the midpoint of the contact surface. The groove reduces the torsional rigidity of the contact surface in the region of the fluid by creating an unsupported seal lip connected to the main seal element only at the diameter farthest from the fluid. This construction allows the projecting lip to be more easily circumferentially deformed by the viscous shear forces such that the waves have a greater helical inclination and become increasingly effective as miniature hydrodynamic pumps. The improved pumping capabilities occasioned by the greater torsional flexing of the waves also reduces the sealing pressure required for dynamic sealing which, in turn, reduces the interface temperatures and lessens thermal degradation of the seal material. The seal lip temperature is also reduced by the larger heat transfer surfaces provided by annular groove. The circulation of fluid around these additional surfaces increases the heat removal from the lip with a consequent reduction in interface temperature.

These and other objects will be apparent to one skilled in the art upon reading the following detailed description, reference being made to the accompanying drawings in which.

Figure 1:
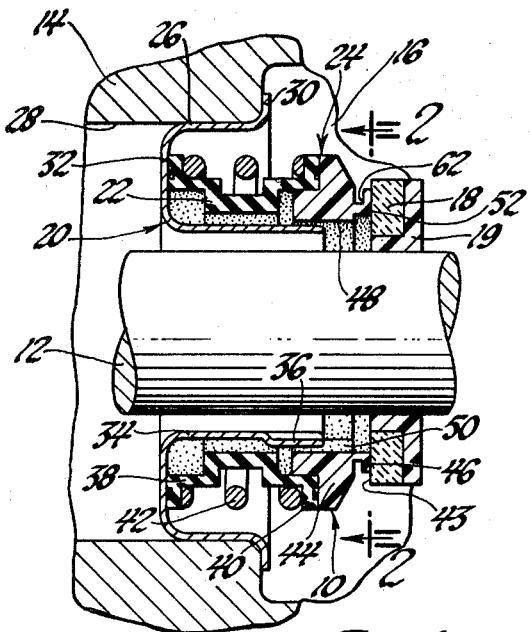
FIG. 1 is a sectional view showing a sealing installation incorporating a self-energizing face seal made in accordance with the present invention.
Figure 2:
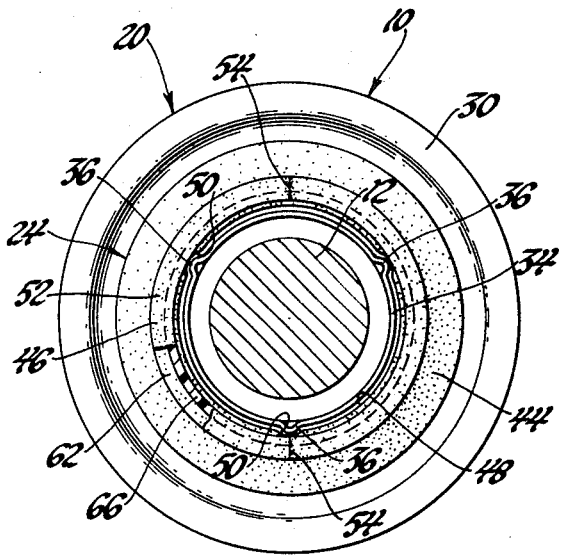
FIG. 2 is a view taken along line 2—2 of FIG. 1.

Referring to FIGS. 1 and 2, there is shown a seal installation incorporating a self-energizing fluid face seal 10 for sealing between a rotatable shaft 12 and a housing 14 to thereby prevent the flow of fluid from a fluid reservoir 16. Generally, the face seal 10 is of the type having a stationary axially facing contact surface which sealingly engages an opposing axial surface such as a cylindrical ceramic seat 18 resiliently carried by an elastomeric sleeve 19 mounted on the shaft 12. However, it will hereinafter be apparent that the present invention is also applicable to other face seal and radial lip seal constructions and, as a general matter, to all seals for sealing between relatively rotating parts.

More particularly, the subject face seal 10 comprises a metallic casing 20, an elastomeric diaphragm 22, and a plastic sealing element 24. The casing 20 includes an outer cylindrical flange 26 fittingly received within a bore 28 formed in the housing 14 and axially located by an outwardly turned lip 30 engaging front surface of the housing 14. An annular base 32 of the casing 20 terminates at its outer diameter with the flange 26 and at its inner diameter with a forwardly projecting guide sleeve 34 through which the shaft 12 projects. A circumferential series of inwardly projecting, axially extending ribs 36 are formed on the inner surface of the guide sleeve 34.

The diaphragm 22 includes an annular heel 38 suitably secured by bonding to the base 32 and a front collar 40 bonded to the rear of the sealing element 24. A helical compression spring 42 is retained between the heel 38 and the collar 40 for axially biasing the sealing element 24 against the sealing surface 43 of the seat 18. The diaphragm 22 of course is circumferentially continuous to act as a positive barrier to the flow of fluid from the reservoir 16.

Figure 3:
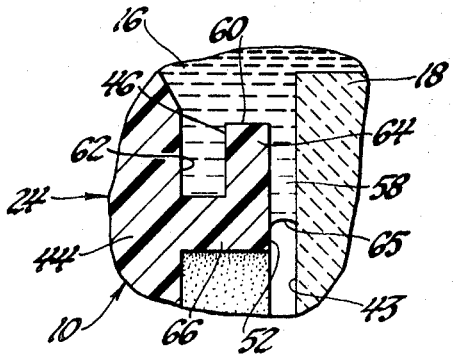
FIG. 3 is an enlarged view of the sealing interface in the seal installation of FIG. 1.
Figure 4:
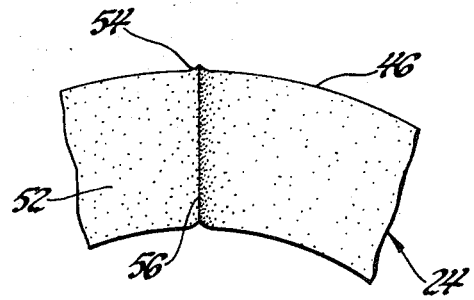
FIG. 4 is an enlarged front view of the seal contact surface showing an undistorted surface wave under static conditions.
Figure 5:
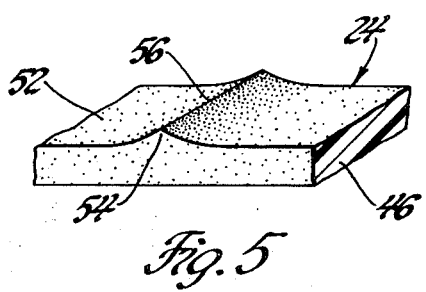
FIG. 5 is a perspective view of the surface wave of FIG. 4.

Referring to FIGS. 2 and 3, the sealing element 24 is generally cylindrical and comprises an enlarged seal body 44 frontally terminating in a radially outwardly extending seal lip 46. The sealing element 24 includes a central opening 48 through which the guide sleeve 34 slidably projects. A circumferential series of grooves 50 are formed in the cylindrical surface of the central opening 48. The grooves 50 register with the ribs 36 to restrain circumferential movement of the sealing element 24. Referring to FIGS. 3 through 5, the seal lip 46 has an annular contact surface 52 which sealingly engages the sealing surface 43 to effect a continuous seal. The necessary load for maintaining this seal is provided by the axial pressure exerted by the spring 42.

In all seals of the type having an annular surface contacting a mating surface, surface irregularities in the form of projections or surface waves 54 are formed in the contact surface 52 during manufacturing, installation, or operation. These waves are minute projections having a generally sinusoidal shape with two waves normally occuring around the circumference of the contact surface 52 although a greater number may be formed in a particular seal. Regardless of the number, each wave 54 includes a ridge surface 56 extending radially across the contact surface 52 which under static operation, is pressed against the sealing surface 43 of the seat 18 to effect a seal.

Figure 6:
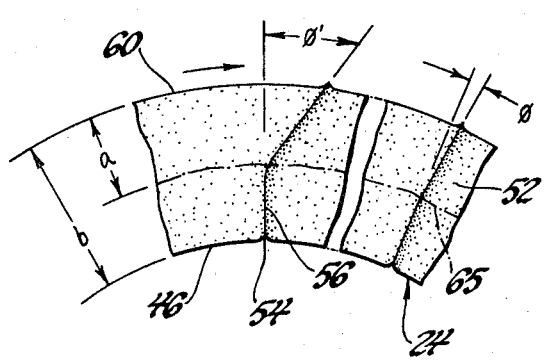
FIG. 6 is a view similar to FIG. 4 showing a surface wave helically distorted under dynamic conditions.

Under dynamic operation, a fluid film 58 migrates inwardly past the outer rim 60 of the seal lip 46 and partially across the contact surface 52. As shown in FIG. 6, the fluid film 58 extends radially a distance a with respect to the width b of the contact surface. The ratio of the fluid film width to the total radial contact surface or a/b is the "wetted fraction." During rotation of the shaft in the direction indicated by the arrow, the wave 54 is circumferentially distorted by the dynamic fluid viscous shear forces and assumes a helical inclination $\phi$ with respect to the static inclination generally throughout its wetted radial distance a.

These deformed waves function as viscous shear pumps to establish a pressure gradient across the contact surface 52 and generate hydrodynamic pumping capabilities for returning fluid to the reservoir. The pumping capabilities and the pressure gradient created by the inherently formed waves 54 are generally measurable only under controlled conditions and do not significantly improve the sealing capabilities. Accordingly, while the waves are helpful in explaining the mechanics of sealing they do little to actually improve sealing performance.

The present invention on the other hand provides means for greatly increasing the helical inclination $\phi$ of these inherent waves to an extend where improved pumping and film characteristics permit favorable modification of seal design parameters. More particularly, an annular groove 62 is formed between the seal lip 46 generally parallel to the contact surface 52 so as to define a thin and torsionally flexible radially outwardly extending seal flange 64 which is torsionally restrained only at a cylindrical axial connecting section 66. As shown in FIG. 6, the wave 54 will achieve a dynamic helical inclination $\phi'$ in accordance with the torsional flexibility of the material for the seal lip 46.

With the above configuration, the torsional flexibility is primarily related to the depth of the groove 62 and the thickness of the flange 64. These parameters are established to optimumly provide a wetted fraction of 0.50 as measured by the meniscus 65 of the fluid film 58. More particularly, for a suitably flexible flange thickness, the depth of the groove 62 should roughly approximate the wetted fraction. At the same time, however, the connecting section 66 should have sufficient thickness to provide the required axial stiffness for the seal flange 64 to support the lip pressure from the spring 42 and counterbalance the pressure of the fluid film 58 without experiencing dynamic instability. Within this range, the thickness of the flange 64 should be as thin as possible to provide the greatest helical inclination $\phi'$. Additionally, inasmuch as the modulus of the material affects the torsional deformity of the waves 54, a change in material at a given depth will permit a heavier section without a reduction in the hydrodynamic pumping action.

The above increase in torsional flexibility of the lip section is of course not necessarily restricted to an annular groove on a face seal. Any section reduction on a fluid seal between the seal body and the contact surface such as slits, holes, or the like which provide increased torsional flexibility on the fluid side of the seal lip will produce the results outlined above. The greater pumping action occasioned by the larger helical angle permits reducing the lip pressure to about 50 percent of conventional values. Inasmuch as the generated temperature at the sealing interface is proportional to lip pressure, a lower interface temperature will be provided which, in turn, will prevent thermal decomposition of the sealing surface, a condition which greatly shortens the life of the seal.

In this respect, improved sealing performance was achieved with a face seal having the following dimensions:

| | |
|---|---|
| $\phi$ Without Groove 62 | Substantially 0 radians |
| $\phi'$ With Groove | $5 \times 10^{-6}$ radians |
| Width of Contact Surface 52 | 0.080 in. |
| Width of Groove | 0.013 in. |
| Depth of Groove | 0.050 in. |
| Lip Load for Sealing With Groove | 14.5 PSI |
| Lip Load for Sealing Without Groove | 31 PSI |
| Material of Seal Element 24 | Phenolic |
| Axial Thickness of the Seal Flange 64 | 0.038 in. |

Although only one form of this invention has been shown and described, other forms will be readily apparent to those skilled in the art. Therefore, it is not intended to limit the scope of this invention by the embodiment selected for the purpose of this disclosure but only by the claims which follow.

What is claimed is:

1. A fluid seal for the space between a pair of relatively rotating members to prevent the leakage of fluid from a reservoir along a fluid leakage path therebetween, comprising: a sealing member on one of the members having an annular contact surface engageable with the other of the members at an interface parallel to the fluid leakage path, said contact surface including inherent surface irregularities which lie substantially parallel to the fluid leakage path between the members; and section weakening means formed in said sealing member immediately adjacent said contact surface and the reservoir and operatively spaced from said contact surface, said means defining a thin flexible section for increasing torsional deforming of said contact surface in the outermost section thereof immediately adjacent said reservoir during relative rotation of said members and establishing a markedly increased helical inclination for said surface irregularities thereby significantly increasing the hydrodynamic pumping action of said surface irregularities.

2. A self energizing face seal for sealing the space between a housing and a relatively rotating member having an axially facing sealing surface so as to prevent the flow of fluid from a reservoir, comprising: a casing adapted to be mounted on the housing; a seal element carried by said casing and including a frontal seal lip having an annular contact surface, said contact surface including inherent surface waves having radially extending ridges substantially parallel to said flow of fluid; spring means operatively connected between said seal lip and said casing for biasing said contact surface against the sealing surface at a sealing interface parallel to said flow of fluid; an annular groove formed in said seal element parallel to said contact surface and closely adjacent said seal lip, said groove being operatively spaced from the contact surface and opening toward said reservoir, said groove establishing a thin flexible section on the outermost section of said seal lip immediately adjacent said reservoir and connected to the seal element remote from the fluid, said flexible section having a decreased torsional rigidity during dynamic operation such that the dynamic viscous shear forces increase the helical inclination of the surface waves and thereby render the latter increasingly effective for generating hydrodynamic forces opposing fluid leakage.

* * * * *